Feb. 12, 1935.  R. I. BATES  1,991,043
VALVE FOR SHOCK ABSORBERS
Filed May 29, 1933
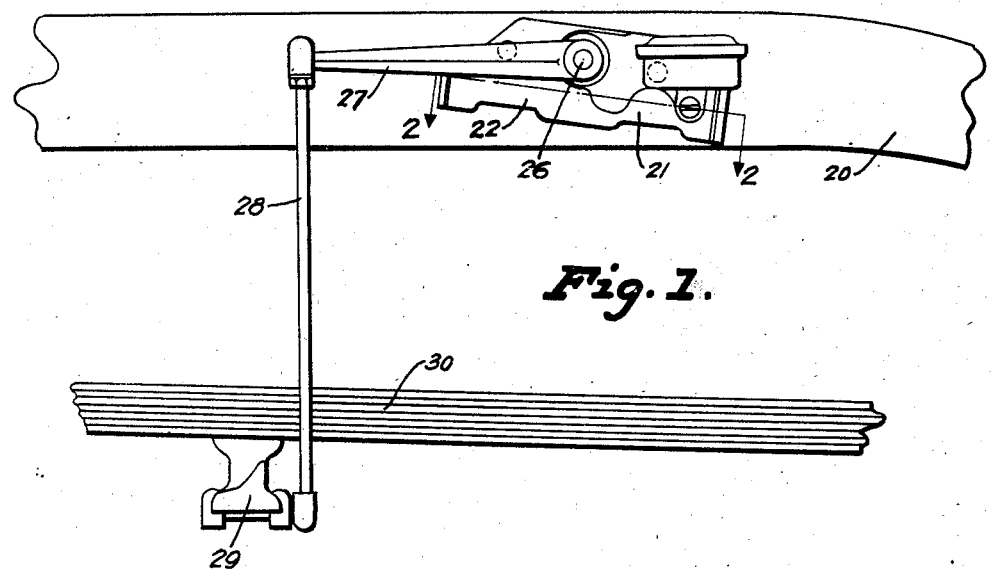
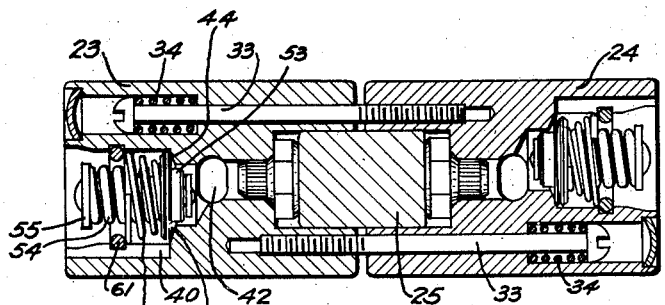
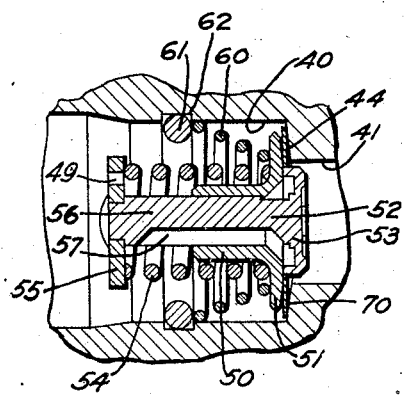
INVENTOR
RALPH I. BATES
BY
ATTORNEY Patented Feb. 12, 1935

1,991,043

UNITED STATES PATENT OFFICE 1,991,043

VALVE FOR SHOCK ABSORBERS

Ralph I. Bates, Dayton, Ohio, assignor, by mesne assignments, to General Motors Corporation, Detroit, Mich., a corporation of Delaware Application May 29, 1933, Serial No. 673,423

3 Claims. (Cl. 277—45)

This invention relates to improvements in hydraulic shock absorbers and particularly to the fluid flow control devices for such shock absorbers.

It is among the objects of the present invention to provide a noiselessly operating fluid flow control device for an hydraulic shock absorber.

It has been found by experiments that where a comparatively flat valve cooperates with a comparatively wide and flat valve seat, the movement of the valve into engagement with said valve-seat would not be as noisy as the movement of said valve out of engagement with the valve-seat. When the valve is moved into engagement with the valve seat, the fluid between the valve and the valve-seat acts as a cushioning medium, for the squeezing of the fluid from between the valve and valve-seat surfaces, tends to prevent the valve from engaging the seat with a clicking, thumping noise. This is not true, however, where the valve engages a comparatively narrow valve-seat.

When the valve is moved out of engagement with the comparatively wide and flat seat, fluid between said valve and seat will provide adhesion, necessitating a comparatively strong pull to unseat the valve, and the breaking of this adhesive seal results in a very distinct and objectionable clicking or thumping noise. Such noises are particularly objectionable in hydraulic shock absorbers, for the present day vehicles, upon which said shock absorbers are used, have fully insulated bodies and chassis, and the shock absorber being mounted upon the body supporting frame of the chassis will have its noise amplified by the body, for said body acts as a sound amplifying medium.

Further objects and advantages of the present invention will be apparent from the following description, reference being had to the accompanying drawing wherein a preferred embodiment of one form of the present invention is clearly shown.

In the drawing:

Fig. 1 shows portions of a vehicle frame and axle, to the former of which is attached an hydraulic shock absorber embodying the present invention.

Fig. 2 is a longitudinal sectional view of the shock absorber taken substantially along the line 2—2 of the device shown in Fig. 1.

Fig. 3 is an enlarged fragmentary sectional view of a displacement member and its associate fluid flow control device.

Referring to the drawing, the numeral 20 designates the frame of the vehicle to which is attached the casing 21 of the shock absorber. This casing provides a cylinder 22 in which a piston including parts 23 and 24, as shown in Fig. 2, is reciprocably supported. This piston is actuated by a lever 25 carried on and actuated by a rocker shaft 26, one end of which has the shock absorber operating arm 27 secured thereto. The free end of said arm 27 is swivelly secured to one end of a link 28, the opposite end of said link being anchored to the axle 29, which axle in turn supports the vehicle spring 30.

The piston portions 23 and 24 are substantially identical and will not be detailedly described. However, in the present instance, it may be said that bolts 33 are provided in each piston head, one bolt passing through an opening in one piston head and screwing into another, while another bolt passes through an opening in the last mentioned piston head and screws into the first mentioned piston head. Springs 34 are provided beneath the heads of each bolt 33, yieldably urging the piston heads toward each other.

For purposes of description, piston head 23 will be referred to as having a recessed portion 40 into which a port 41 opens, this port in turn being connected with the reservoir or chamber in the casing 21 between piston heads 23 and 24 through the passage 42. The port 41 being of smaller diameter than the recess 40 in piston head portion 23, thus provides a shoulder 44, the surface of which slopes inwardly as it approaches the port 41. This is clearly shown in Figs. 2 and 3.

The fluid flow control device for regulating the fluid flow through the port 41 in either direction comprises a control valve 50 having a tubular body portion and an outwardly extending flange 51, the end surface of said control valve 50, or more particularly the surface of the flange 51 more adjacent the valve-seat surface 44, sloping so as to be substantially parallel to the valve seat surface 44. A plunger-valve 52 is slidably supported within the tubular body portion of the valve 50, this plunger-valve having a head portion 53 adapted normally to be held against the outer or sloping surface of the valve-flange 51 by a spring 54 which is interposed between valve-flange 51 and an abutment washer 55 on the valve 52. The stem 56 of valve 52 is provided with a groove or cut-away portion 57 terminating beneath the head 53 of the valve 52 at one end and beyond the confines of the tubular portion of the valve 50 at the opposite end. Washer 55 has openings 49 coming within the interior of the convolutions of spring 54 thereby preventing a complete stoppage of fluid flow into the groove 57 of valve 56 when and if spring 54 is compressed to cause its convolutions to engage. A spring 60, comparatively lighter than the spring 54, is interposed between the valve flange 51 and a retainer ring 61, fitting itno a groove 62 in the annular surface of recess 40 in piston portion 23.

A flexible disc 70 being centrally apertured, fits over the head portion 53 of the valve 52 so as to engage the end surface of valve 50, this disc 70 normally spacing valve 50 from the valve seat 44. As shown in Fig. 3, spring 60 engaging valve 50 urges it toward the seat 44 causing the outer peripheral edge of disc 70 normally to engage the valve-seat 44 while the periphery of the central aperture of said disc 70 is maintained in engagement with the valve-flange 51.

The device above described functions as follows:

When the road wheels (not shown, but supported by axle 29) strike an obstruction in the roadway, the axle 29 and its spring 30 are thrust upwardly toward the frame 20, resulting in a clockwise rotation of shaft 26 and through lever 25 a movement of piston portions 23 and 24 toward the left as regards Fig. 1. Fluid in the left end of cylinder 22 will have pressure exerted thereupon, which pressure being exerted against valve 50 will move said valve toward the seat 44, thereby flexing the disc 70 to cause its flat engagement with the sloping surfaces of the valve-seat and adjacent portion of valve-flange 51, the valve 50 thereby clamping the disc so that it provides a sealing member between the seat 44 and the valve-flange 51 to prevent fluid from flowing around valve 50. The pressure, when reaching a predetermined higher value, will move the valve 52 against the effect of its spring 54 so that its head portion 53 is moved out of engagement with the valve-flange 51, thus there will be established a fluid flow from the left end of cylinder 22 through the channel or cut-away portion 57 of valve 52 through valve 50, passing the valve head 53 and then through port 41 into the reservoir. This flow is restricted due to the provision of a heavy spring 54 acting to urge valve 52 toward the closed position.

Upon the reverse movement of the piston members 23 and 24, that is, movements toward the right as regards Fig. 1, in response to the separating movement of the frame 20 and axle 29, which results from the rebounding movement of spring 30 to assume normal load position, fluid within the reservoir acting through passage 41 against the fluid flow control device for said port will move the entire device as a unit so that the valve flange 51 moves away from valve-seat 44, resulting in an unflexing or extending movement of the disc 70 from said valve-seat for establishing a substantially free flow of fluid through port 41 into the left end of the cylinder 22. This fluid flow through the port 41 will naturally maintain disc 70 against the valve flange 51.

From the aforegoing it may be seen that as the valve 50 is moved toward seat 44, the disc 70 is flexed to assume a shape coinciding with the slope of the adjacent valve seat and valve surfaces, the flexing of the disc resulting in a progressive seating of the disc upon said sloping surfaces, which seating may also be termed as being made with a rolling effect, thus entirely eliminating the flat metal-to-metal contact of a flat valve against its flat valve-seat and thereby eliminating any chance of clicking or thumping noises which usually occur in the seating of a flat valve upon a flat valve-seat, particularly when the valve seat is comparatively narrow. The greatest benefit obtained from this construction, however, is during the unseating of valve 50, even though there is a fluid film between the adjacent surfaces of the seat and disc and the disc and valve surface, still the seal is not broken at once or simultaneously as when a valve pulled directly at right angles from its contacting valve-seat surface, but the seal is broken with a progressive, rolling effect due to the flexed disc unflexing or extending and assuming its flat position, due to the movement of the valve 50 away from seat 44.

By his present invention applicant has provided a comparatively simple fluid flow control device which may be produced and assembled cheaply and which substantially eliminates all usual valve noises. The device may be completely assembled for purposes of testing in a separate machine before it is assembled in the shock absorber in which it is to be used finally.

While the form of embodiment of the present invention as herein disclosed, constitutes a preferred form, it is to be understood that other forms might be adopted, all coming within the scope of the claims which follow.

What is claimed is as follows:

1. A fluid flow control device for the intake and discharge port of a fluid displacement chamber of a hydraulic shock absorber comprising, in combination, a valve member adapted to permit a substantially free flow of fluid into said chamber; another valve member adapted to permit a restricted flow of fluid from said chamber; and a flexible metal disc fitting loosely about the last mentioned valve member and adapted to be flexed by the other valve.

2. In a hydraulic shock absorber having a fluid displacement chamber provided with a port having a dish-shaped valve-seat; a fluid flow control device normally closing said port, said device comprising cooperating valve members one of which is adapted to permit a substantially free flow of fluid through the port into said chamber, the other being adapted to permit a restricted flow of fluid from said chamber through said port; and a ring-shaped disc of flexible metal, fitting loosely about the last mentioned valve member and normally having its periphery engaging the valve-seat, and adapted to be flexed into surface engagement with said valve-seat by the first mentioned valve member.

3. In a hydraulic shock absorber having a fluid displacement chamber provided with a port having a dish-shaped valve seat; a fluid flow control device normally closing said port; said device comprising cooperating valve members, the first of which has a surface coinciding substantially with the dish-shaped valve-seat, said valve member being yieldably urged toward said seat and being adapted to permit a substantially free flow of fluid through the port into said chamber, the second valve member seating upon the first and being adapted to permit a restricted flow of fluid from the chamber through the port; and a ring-shaped, metallic, flexible disc fitting loosely about the second valve member, its inner peripheral edge normally engaging the surface of the first mentioned valve member, its outer peripheral edge normally engaging the valve-seat, but adapted to be flexed into surface engagement with both the first mentioned valve member and the valve-seat by said first mentioned valve-member.

RALPH I. BATES.